(12) United States Patent
Irube et al.

(10) Patent No.: US 8,971,507 B2
(45) Date of Patent: Mar. 3, 2015

(54) FACSIMILE SERVER, FACSIMILE SYSTEM, AND FACSIMILE TRANSMISSION METHOD

(71) Applicant: Kabushiki Kaisha Toshiba, Minato-ku (JP)

(72) Inventors: Akira Irube, Kanagawa (JP); Minoru Namekata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/970,200

(22) Filed: Aug. 19, 2013

(65) Prior Publication Data

US 2014/0064466 A1    Mar. 6, 2014

(30) Foreign Application Priority Data

Sep. 5, 2012   (JP) ................. 2012-195421

(51) Int. Cl.
*H04M 11/00* (2006.01)
*H04M 3/53* (2006.01)

(52) U.S. Cl.
CPC ...................................... *H04M 3/53* (2013.01)
USPC .................................................. 379/100.01

(58) Field of Classification Search
None
See application file for complete search history.

(56) References Cited

U.S. PATENT DOCUMENTS

| | | | | |
|---|---|---|---|---|
| 5,247,591 A | * | 9/1993 | Baran | 382/179 |
| 5,973,791 A | * | 10/1999 | Yamamuro et al. | 358/403 |
| 2008/0007790 A1 | * | 1/2008 | Fujita | 358/400 |
| 2010/0027369 A1 | | 2/2010 | Okuda et al. | |
| 2010/0180204 A1 | | 7/2010 | Mathur | |

FOREIGN PATENT DOCUMENTS

| | | |
|---|---|---|
| JP | 2001-068650 A | 3/2001 |
| JP | 2007-208957 | 8/2007 |
| JP | 2009-176159 | 8/2009 |
| JP | 2010-165353 | 7/2010 |

* cited by examiner

*Primary Examiner* — Maria El-Zoobi
(74) *Attorney, Agent, or Firm* — White & Case LLP

(57) ABSTRACT

A facsimile server includes: a communication section configured to receive a transmit file containing meta-information relating to a phone number and transmit information from an external device, a facsimile image generating section configured to convert the transmit information into a facsimile image, a phone number processing section configured to obtain the phone number from the meta-information, and a FAX modem processing section configured to connect to a public switched telephone network according to the phone number obtained by the phone number processing section and transmit the facsimile image to the public switched telephone network.

15 Claims, 4 Drawing Sheets

FACSIMILE SERVER, FACSIMILE SYSTEM, AND FACSIMILE TRANSMISSION METHOD

CROSS REFERENCE TO RELATED APPLICATION

This application is based upon and claims the benefit of priority from the prior Japanese Patent Application No. 2012-195421 filed on Sep. 5, 2012; the entire contents of which are incorporated herein by reference.

FIELD

An embodiment described herein relates generally to a facsimile server and a facsimile system.

BACKGROUND

Conventionally, facsimile apparatuses have widely been used in ordinary households. As with ordinary telephone sets, facsimile apparatuses are connected to a public switched telephone network (PSTN network) when the apparatuses are used, and transmit an image after binarizing the image. In order to perform communication of an image using a facsimile apparatus, a transmit sheet is set in the facsimile apparatus and then a line number (subscriber number) of a transmission destination is input via, e.g., dialing.

The facsimile apparatus transmits a dialing signal based on the inputted line number to the PSTN network to perform communication with the transmission destination facsimile apparatus. The facsimile apparatus converts image information on the set transmit sheet into a facsimile signal, which is binary infatuation, and transmits the facsimile signal to the transmission destination apparatus according to a predetermined communication protocol.

However, in order to perform communication of an image using a facsimile apparatus, it is necessary to prepare a sheet with an image to be transmitted thereon.

Note that although systems configured to transmit a facsimile image via a PSTN network or the Internet network (IP communication network) using a personal computer (hereinafter also referred to as "PC") have been developed, it is necessary to consistently keep the power of the PC on and also consistently connect the PC to a telephone wiring for a PSTN network or an Ethernet cable, and thus, facsimile apparatuses configured to transmit/receive a facsimile image via a PSTN network or the Internet network using a PC are substantially not in widespread use, but currently in limited use.

DETAILED DESCRIPTION

According to an embodiment, a facsimile server includes: a communication section configured to receive a transmit file containing meta-information relating to a phone number and transmit information from an external device; a facsimile image generating section configured to convert the transmit information into a facsimile image; a phone number processing section configured to obtain the phone number from the meta-information; and a FAX modem processing section configured to connect to a public switched telephone network according to the phone number obtained by the phone number processing section and transmit the facsimile image to the public switched telephone network.

Figure 1:
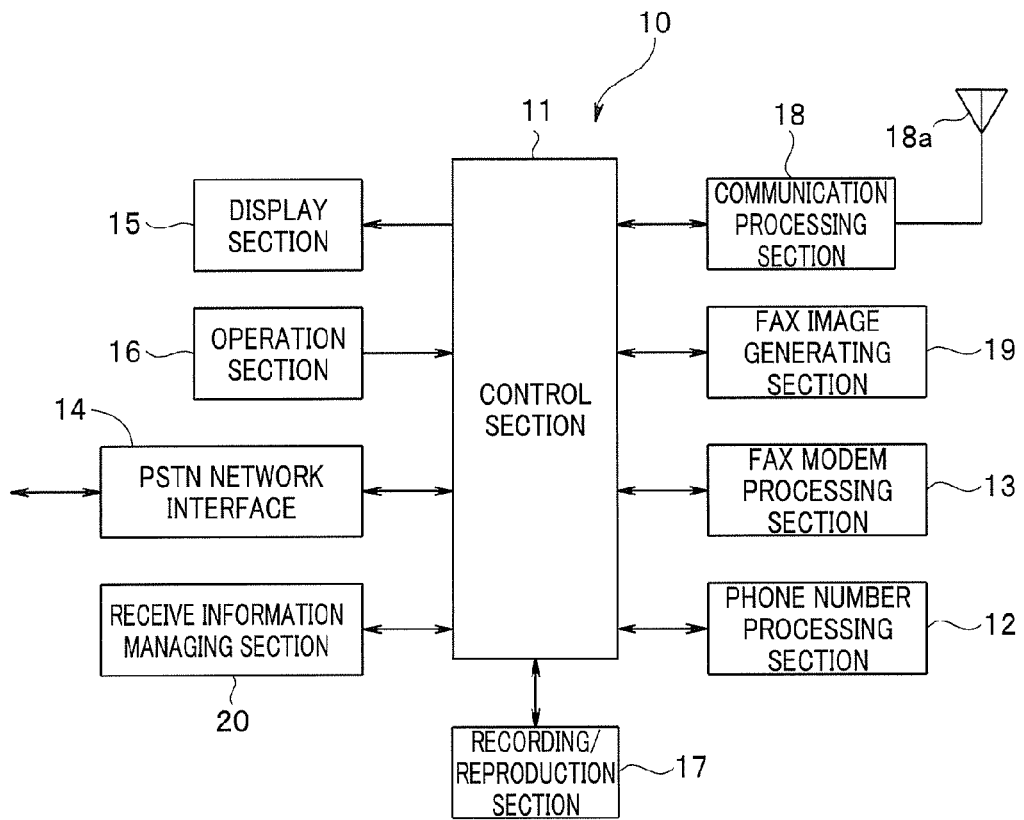
FIG. 1 is a block diagram illustrating a facsimile server according to an embodiment of the present invention.

An embodiment of the present invention will be described in detail below with reference to the drawings. FIG. 1 is a block diagram illustrating a facsimile server according to an embodiment of the present invention.

A facsimile server 10 includes a FAX modem processing section 13 and a PSTN network interface 14. The FAX modem processing section 13 transmits/receives signals necessary for facsimile transmission/reception to/from a PSTN network under the control of a control section 11. A facsimile image compressed as a result of the FAX modem processing section 13 performing binary image compression coding such as MH (Modified Huffman), MR (Modified READ) or MMR (Modified Modified READ) is sent out to the PSTN network according to FAX transmission standards such as G3 or G4.

The PSTN network interface 14 performs communication with the PSTN network under the control of the control section 11: the PSTN network interface 14 receives a facsimile signal from the PSTN network and transmits a facsimile signal from the control section 11 via the PSTN network.

Furthermore, in the facsimile server 10, a display section 15 and an operation section 16 are also provided. The display section 15 provides display based on display information provided by the control section 11. Therefore, the display section 15 can display, e.g., a menu for FAX transmission. The operation section 16 includes, e.g., a keyboard and switches, which are not illustrated, and outputs an operation signal, which is based on any of various settings, an input of a phone number or a user operation for implementing any of various functions, to the control section 11. Note that in the present embodiment, the display section 15 and the operation section 16 are not necessarily essential components, and facsimile signal transmission/reception is possible even where the display section 15 and the operation section 16 are omitted.

In the present embodiment, in the facsimile server 10, a communication processing section 18 is provided. The communication processing section 18 can communicate with an external device by means of wireless communication via an antenna 18a under the control of the control section 11. For example, the communication processing section 18 performs communication with an external device via any of various wireless communications such as wireless LAN and Bluetooth (registered trademark). Note that the communication processing section 18 may communicate with an external device not only via wireless communications but also via wire communications represented by Ethernet. In this case, the antenna 18a is not needed, and various data files transmitted from an external device can be received by the communication processing section 18.

In the present embodiment, in the facsimile server 10, a FAX image generating section 19 is provided. The FAX image generating section 19 can convert any of various data files into an image format for FAX transmission such as MH, MR or MMR under the control of the control section 11. For example, the FAX image generating section 19 can convert, e.g., a file in a JPEG, BMP or PDF format, any of various word processor formats, any of CAD formats or any of spreadsheet formats or a text file into a facsimile image in an image format for FAX transmission.

The recording/reproduction section 17 records various data provided by the control section 11 and reproduces recorded data and outputs the data to the control section 11 under the control of the control section 11. For example, the recording/reproduction section 17 can record a facsimile image generated by the FAX image generating section 19.

Note that for the recording/reproduction section 17, a card interface such as an SD card may be employed, or an incorporated non-volatile memory or the like may be employed.

Figure 2:
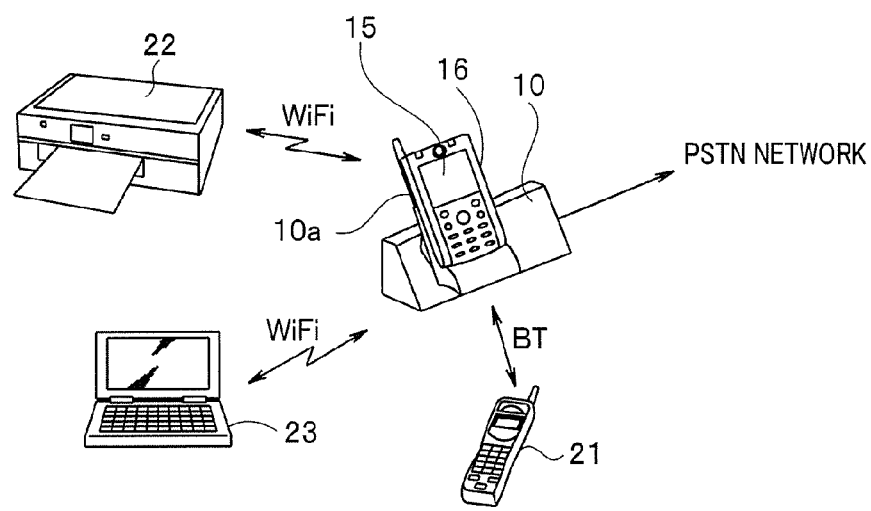
FIG. 2 is a diagram for describing a facsimile system in which a facsimile server 10 and external devices cooperate with each other.

The facsimile server 10 in the present embodiment receives an input of data from an external device, and transmits an image based on the inputted data via facsimile. FIG. 2 is a diagram for describing a facsimile system in which the above-described facsimile server 10 and external devices cooperate with each other.

In the facsimile server 10, a main phone 10a, which corresponds to the display section 15 and the operation section 16 in FIG. 1, is provided so as to be attachable/detachable to/from the facsimile server 10. The main phone 10a and the facsimile server 10 can communicate with each other via a non-illustrated contact terminal provided in the facsimile server 10. The main phone 10a and the facsimile server 10 can also communicate with each other via wireless communications such as a wireless LAN or Bluetooth (registered trademark).

The facsimile server 10 builds a wireless network, for example, a wireless LAN network, by means of the communication processing section 18, and performs wireless communication with external devices 22 and 23 existing within a region in which communication via the wireless LAN network is possible. The facsimile server 10 can also communicate with an extension 21 via, e.g., Bluetooth (registered trademark) or a wireless LAN.

The external device 22 is a multifunction peripheral, has, for example, a printer function, a scanner function and a copier function, and is configured so that the external device 22 can transmit image information obtained by means of any of these functions to the facsimile server 10 via the wireless LAN network. The external device 23 is a personal computer (PC) and is configured so that the external device 23 can transmit any of, e.g., image data, word processor data, CAD data, spreadsheet data and text data to the facsimile server 10 via the wireless LAN network. Note that for the external devices, various devices that can transmit various types of data files, based on which facsimile images are generated, can be employed, and for example, a smartphone can be employed. A point of the configuration described herein lies in that image information transmitted from the external device 22 has a format of a type that is the same as that of information transmitted from the external device 23 or the smartphone to the facsimile server 10. The format is, for example, a file format such as a JPEG, BMP or PDF format, any of various word processor formats, any of CAD formats or any of spreadsheet formats or a file format for a text file.

In an ordinary facsimile apparatus, an operation section for inputting a phone number is provided, and a phone number of a transmission destination party is designated by operation of the operation section, and the FAX modem is controlled according to the designated phone number of the transmission destination party, enabling facsimile communication via the PSTN network.

Although in the present embodiment, a transmit image is designated by, e.g., the PC, which is an external device, the FAX modem cannot directly be controlled by, e.g., the PC via the wireless LAN. Therefore, the facsimile server 10 includes a phone number processing section 12 configured to extract a phone number from information from an external device.

On the other hand, each of the external devices transmits information such as a phone number as meta-information for a transmit file. For example, an external device makes phone number information be included in attributes of a transmit file as meta-information, or transmits phone number information in a file separate from a transmit file. Also, an external device may generate a transmit file with an image, which includes a phone number, attached to a predetermined position in a transmit image, for example, a first page of a sheet, included in the transmit file and with actual transmit images arranged on a second page onwards.

Also, for example, where an image printed on a sheet is transmitted via facsimile from the external device 22, a phone number may be put at a head of the sheet. The external device 22 reads a transmit image with a transmission destination phone number included therein by means of the scanner function, and transmits the transmit image to the facsimile server 10 as image information.

Figure 3:
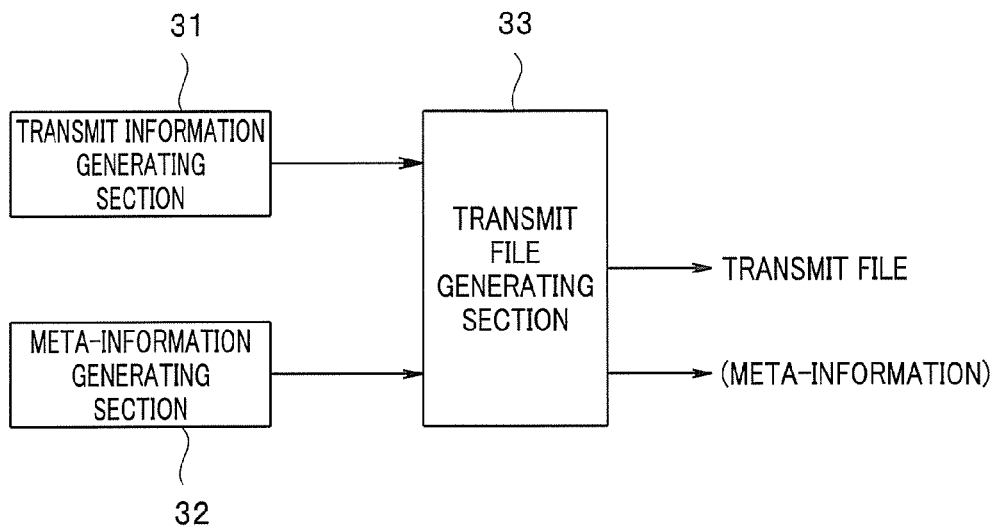
FIG. 3 is a block diagram illustrating a circuit configuration of a part of an external device, the part being configured to generate a transmit file to be transmitted to a facsimile server 10.

FIG. 3 is a block diagram illustrating a circuit configuration of a part of an external device such as described above, the part being configured to generate a transmit file to be transmitted to the facsimile server 10. Also, each of FIGS. 4 and 5 is a flowchart illustrating the flow of operation for an external device to generate and transmit a transmit file.

A transmit information generating section 31 generates transmit information, based on which a facsimile image to be transmitted is generated. For example, if the external device is a personal computer, the transmit information generating section 31 can be provided by any of various application programs. Also, for example, if the external device is a scanner, the transmit information generating section 31 can generate image information, which is transmit information, by means of scanning a sheet. A meta-information generating section 32 generates meta-information including phone number information. The meta-information may include, for example, information such as date and time of file generation and date and time of transmission.

Figure 4:
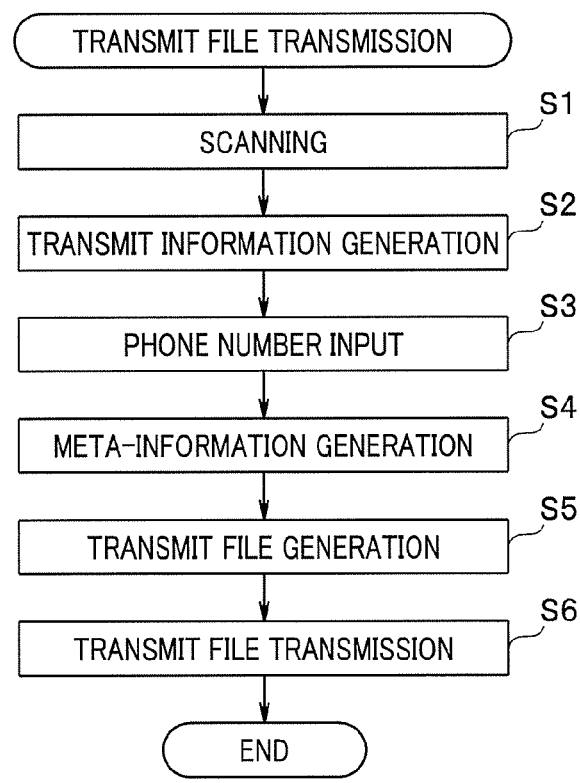
FIG. 4 is a flowchart illustrating the flow of an operation for an external device to generate and transmit a transmit file.
Figure 5:
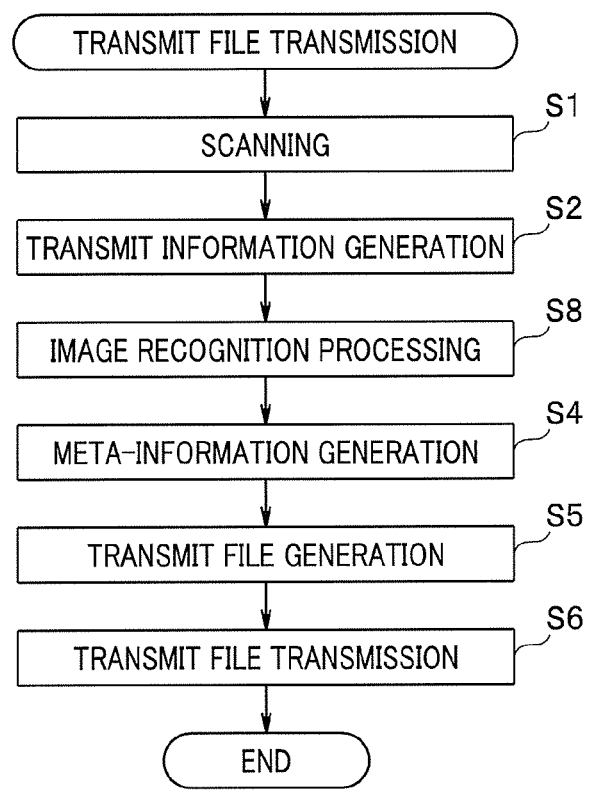
FIG. 5 is a flowchart illustrating the flow of an operation for an external device to generate and transmit a transmit file.

Each of FIGS. 4 and 5 illustrates the flow for generation and transmission of a transmit file where the external device is a scanner. The external device scans a sheet in step S1, whereby the transmit information generating section 31 generates transmit information (step S2). If the scanner includes an operation section for input of, e.g., a phone number, the operation section is operated (step S3), whereby the meta-information generating section 32 generates meta-information (step S4). If no operation section for input of, e.g., a phone number is provided in the scanner, the meta-information generating section 32 performs image recognition processing on an image of a phone number obtained by the scan of the sheet (step S8) to generate the meta-information. Note that the meta-information may be image information of an image including a phone number or data resulting from reading and coding the image information by means of character reading processing.

Furthermore, the meta-information generating section 32 may generate the meta-information not by recognizing an image of a phone number by image recognition processing, but by putting, e.g., a phone number in a prescribed position on a sheet or on a predetermined sheet and recognizing the phone number at that position. Also, for example, an image including a particular figure, enabling the image to be recognized as indication of a phone number, by, e.g., marking a phone number in bright red, is provided so that the meta-information generating section 32 can recognize the image as a part in which the phone number is included.

Note that, if the external device is a personal computer (PC), the meta-information generating section 32 can generate meta-information including a phone number from an input by a user or address list data.

The transmit file generating section 33 receives the outputs of the transmit information generating section 31 and the meta-information generating section 32 and generates a transmit file (step S5). Note that the transmit file generating section 33 may generate a transmit file containing the transmit information and the meta-information or may generate a transmit file based on the transmit information and a meta-information file based on the meta-information as separate files. For example, the transmit file generating section 33 may provide a file name of "xxxx.doc" (document file) to a transmit file based on which a transmit image is generated and provide a file name of, e.g., "xxxx.inf" or "xxxx.html to the meta-information. Note that the meta-information may be in a hidden file or a file with ordinary attributes. If the meta-information is described in a markup language such as html, e.g., confirmation of the meta-information can easily be performed in, e.g., a personal computer.

Note that for simplicity of the description, hereinafter, a transmit file from an external device refers to both a file containing two files, i.e., a transmit file based on transmit information and a meta-information file based on meta-information, and one file containing transmit information and meta-information.

The transmit file generating section 33 transmits the generated transmit file to the facsimile server 10 (step S6). Note that the transmission processing may be performed in response to operation of, e.g., a non-illustrated transmission button provided in the external device by a user, or may automatically be performed after an end of the scan, in response to, e.g., operation for the scan or an input of a phone number by a user. Furthermore, it is possible that the transmit file generated by the external device is recorded in a non-illustrated recording medium and transmission processing is performed in response to processing for access to the recording medium from the facsimile server 10.

The external device can be configured so as to automatically generate meta-information when the external device generates a transmit file. Also, where multicast transmission (to a plurality of transmission destination parties) is considered, it is possible that the external device manage the meta-information separately from the transmit file so that deletions and additions can be made as necessary until just before transmission.

The phone number processing section 12 of the facsimile server 10 is configured to extract information of a phone number included in the meta-information in the transmit file and sets the phone number in the FAX modem processing section 13 under the control of the control section 11. For example, if meta-information of a phone number is included as image information in image information received by the communication processing section 18, the phone number processing section 12 extracts the phone number by means of character reading processing for reading characters from the image information.

Consequently, e.g., the external devices 22 and 23 such as a PC can transmit a facsimile image corresponding to a transmit file to a designated party via facsimile by transmitting a file with a phone number added as meta-information, to the facsimile server 10.

The facsimile server 10 can not only transmit a facsimile signal but also can receive a facsimile signal. The FAX modem processing section 13 extracts a facsimile image from a facsimile signal received via the PSTN network interface 14 and outputs the facsimile image to a receive information managing section 20. The receive information managing section 20 creates a file of the received facsimile image and records the file in the recording/reproduction section 17. In this case, the receive information managing section 20 concurrently records information such as a phone number of a transmitter and data and time of reception, in association with the received facsimile image.

Note that the receive information managing section 20 may record the facsimile image in the recording/reproduction section 17 after conversion of the facsimile image into a file in, e.g., a JPEG, PDF or BPM format. Furthermore, the control section 11 may have a function that notifies an external device of the facsimile image being recorded by the receive information managing section 20, via the communication processing section 18. Also, the control section 11 may further have a function that transfers the facsimile image recorded by the receive information managing section 20 to an external device, via the communication processing section 18.

The control section 11 may include, for example, a general-purpose MCU (microcontroller), and controls the respective sections to provide a facsimile (FAX) function. Note that the functions of, e.g., the FAX modem processing section 13, the phone number processing section 12 and the FAX image generating section 19 may be provided by the general-purpose MCU, and in this case, the control section 11 can provide the functions of, e.g., operation control, PSTN circuit control, phone number extraction processing, FAX image generation processing and FAX modem processing.

Also, the control section 11 can record a transmission history and a reception history in the recording/reproduction section 17. Also, a Web server function may be provided to the control section 11. In this case, information in the transmission history and the reception history can be, for example, referred to, changed or deleted via an external device, using an application.

Next, an operation of the embodiment configured as described above will be described with reference to the flowchart in FIG. 6.

Figure 6:
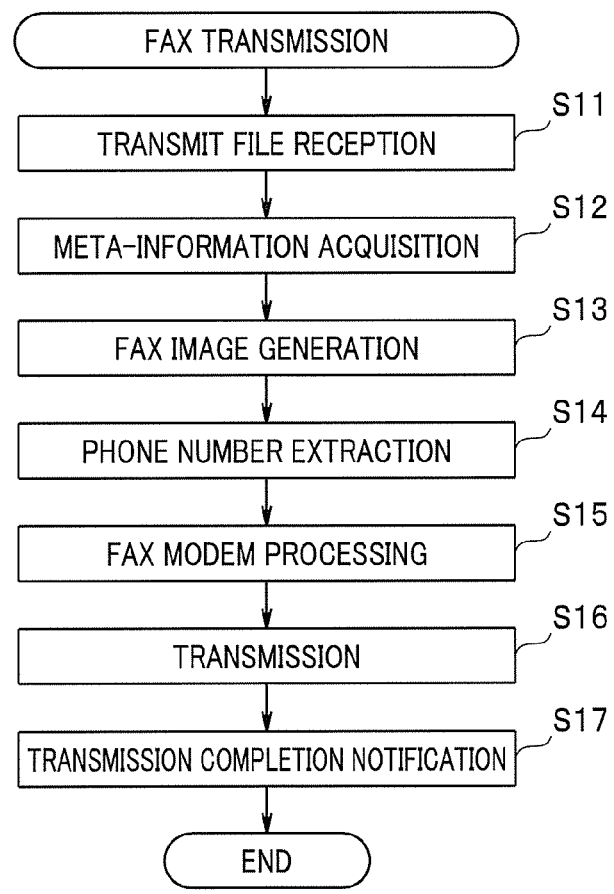
FIG. 6 is a flowchart for describing an operation of the embodiment.

In step S11 in FIG. 6, the communication processing section 18 receives a transmit file from an external device. The transmit file contains meta-information. The communication processing section 18 extracts the meta-information contained in the transmit file (step S12). Note that, if the meta-information is not contained in the transmit file but is transmitted in a separate file, the communication processing section 18 also receives the meta-information file (step S11) and obtains the meta-information (step S12).

The communication processing section 18 provides transmit information contained in the transmit file to the FAX image generating section 19. Examples of the transmit information include not only information in an image format such as JPEG or PDF but also various types of information in, e.g., word processor formats, CAD formats and spreadsheet formats. The FAX image generating section 19 converts the information of any such type into a facsimile image (step S13).

Also, the phone number processing section 12 extracts a phone number from the meta-information (step S14) and sets the extracted phone number in the FAX modem processing section 13. Note that, if the meta-information is information generated as a result of the phone number being put into, e.g., character codes, the phone number processing section 12 provides the phone number put into the codes to the FAX modem processing section 13 as it is. Also, if the meta-information is generated as image information indicating shapes of characters of the phone number, the phone number processing section 12 obtains the phone number from the image information by means of character reading processing and provides the phone number to the FAX modem processing section 13.

The FAX modem processing section 13 transmits a dialing signal based on the phone number set by the phone number processing section 12 to the PSTN network via the PSTN network interface 14 (step S15), and when a connection to a transmission destination party is established, the FAX modem processing section 13 transmits the facsimile image generated by the FAX image generating section 19 to the PSTN network via the PSTN network interface 14 according to FAX transmission standards (step S16).

Upon completion of transmission of the facsimile image, the control section 11 notifies the external device from which the transmit file has been transmitted, of the completion of the transmission, via the communication processing section 18 (step S17).

Note that a facsimile signal from the PSTN network may be received via the PSTN network interface 14. The received facsimile signal is converted into a facsimile image by the FAX modem processing section 13. The receive information managing section 20 creates a file of the received facsimile image and records the file in the recording/reproduction section 17. Concurrently, the receive information managing section 20 records information such as a phone number of a transmitter and date and time of the reception in association with the received facsimile image. The control section 11 notifies all the external devices of the facsimile image being recorded by the receive information managing section 20, via the communication processing section 18. Each external device can retrieve a reception content recorded in the recording/reproduction section 17, via the communication processing section 18.

As described above, in the present embodiment, an external device generates and transmits transmit information, based on which a facsimile image is generated, and meta-information including phone number information. The facsimile server receives the transmit file, obtains the transmit information and the meta-information, converts the transmit information into a facsimile image and extracts a phone number from the meta-information. The facsimile server sets the extracted phone number in the FAX modem processing section to transmit the facsimile image. As described above, use of a facsimile server enables transmission of a facsimile image to a PSTN network by means of data communications via a wireless system such as a wireless LAN or Bluetooth from, e.g., a personal computer or a multifunction peripheral.

Conventionally, when it is intended to transmit an image based on data generated by a personal computer, via facsimile, it is necessary to first perform printing based on the data, and scan the printed sheet and manually input a phone number in the facsimile apparatus, and thus, it is extremely troublesome to perform facsimile transmission to a PSTN network based on data that can be processed in a personal computer (PC). Also, in the case of a PC with a FAX modem incorporated therein, there are restrictions of, e.g., it being necessary to connect a cable for a PSTN line to the PC, and in particular, in order to provide a reception function, it being necessary to make the PC consistently operate.

While certain embodiments have been described, these embodiments have been presented by way of example only, and are not intended to limit the scope of the inventions. Indeed, the novel devices and methods described herein may be embodied in a variety of other forms; furthermore, various omissions, substitutions, and changes in the form of the embodiments described herein may be made without departing from the spirit of the inventions. The accompanying claims and their equivalents are intended to cover such forms or modification as mould fall within the scope and spirit of the inventions.

What is claimed is:

1. A facsimile server comprising:
    a communication section configured to receive a transmit file containing meta-information relating to a phone number and transmit information from an external device;
    a facsimile image generating section configured to convert the transmit information into a facsimile image;
    a phone number processing section configured to obtain the phone number from the meta-information contained in a second file that is different from a first file containing the transmit information: and
    a FAX modem processing section configured to connect to a public switched telephone network according to the phone number obtained by the phone number processing section and transmit the facsimile image to the public switched telephone network.

2. The facsimile server according to claim 1, wherein the phone number processing section obtains the phone number from the meta-information that is image information, via character reading processing.

3. The facsimile server according to claim 1, further comprising a receive information managing section configured to store a facsimile image based on a facsimile signal received by the FAX modem processing section via the public switched telephone network, and notify the external device of the reception of the facsimile image.

4. The facsimile server according to claim 3, wherein the receive information managing section is configured to transfer the stored facsimile image to the external device via the communication section.

5. The facsimile server according to claim 1, further comprising a control section configured to manage a transmission history and a reception history for the FAX modem processing section.

6. A facsimile system comprising:
    at least one external device; and
    the facsimile server according to claim 1.

7. The facsimile system according to claim 6, wherein the at least one external device is configured to transmit the transmit file to the facsimile server via wireless communication.

8. The facsimile system according to claim 6, wherein the external device transmits an image of the phone number as the meta-information.

9. The facsimile system according to claim 6,
    wherein the external device is a personal computer; and
    wherein the personal computer includes a meta-information generating section configured to generate meta-information containing a phone number from an input by a user or address list data.

10. The facsimile system according to claim 6, wherein the external device transmits the transmit file in response to access from the communication section of the facsimile server.

11. A facsimile transmission method for a facsimile system including an external device configured to transmit a transmit file including a first file containing meta-information relating to a phone number and a second file containing transmit information and different from the first file, and a facsimile server configured to receive the transmit file and transmit a facsimile image based on the received transmit file to a public switched telephone network, the method comprising:

the external device generating the transmit information by scanning a sheet, generating the meta-information by an input of the phone number, and generating the transmit file including the first and second files based on the transmit information and the meta-information.

12. A facsimile transmission method for a facsimile system including an external device configured to transmit a transmit file including a first file containing meta-information relating to a phone number and a second file containing transmit information and different from the first file, and a facsimile server configured to receive the transmit file and transmit a facsimile image based on the received transmit file to a public switched telephone network, the method comprising:

the external device generating the transmit information by scanning a sheet, generating the meta-information via image recognition processing for an image obtained by the scan, and generating the transmit file including the first and second files based on the transmit information and the meta-information.

13. A facsimile transmission method for a facsimile system including an external device configured to transmit a transmit file including a first file containing meta-information relating to a phone number and a second file containing transmit information and different from the first file, and a facsimile server configured to receive the transmit file and transmit a facsimile image based on the received transmit file to a public switched telephone network, the method comprising:

the facsimile server receiving the transmit file, converting the transmit information into a facsimile image, obtaining the phone number from the meta-information, connecting to the public switched telephone network according to the obtained phone number, and transmitting the facsimile image to the public switched telephone network.

14. The facsimile server according to claim 1, wherein the external device can transmit various types of data files based on which the facsimile image is generated.

15. The facsimile server according to claim 14, wherein the various types of data files have formats that are processable by a computer.

* * * * *